US012276410B2

(12) United States Patent  (10) Patent No.: US 12,276,410 B2
Abdulhayoglu et al.  (45) Date of Patent: Apr. 15, 2025

(54) LED LIGHT WITH REPLACEABLE MODULE AND INTELLIGENT CONNECTIVITY

(71) Applicant: Ezlo Innovation LLC, Clifton, NJ (US)

(72) Inventors: Melih Abdulhayoglu, Montclair, NJ (US); Stephan Lawson, Malvern, PA (US); Chris Marks, Philadelphia, PA (US); Daniel Massam, Langhorne, PA (US); Breanna Stachowski, Elma, NY (US)

(*) Notice: Subject to any disclaimer, the term of this patent is extended or adjusted under 35 U.S.C. 154(b) by 0 days.

(21) Appl. No.: 16/953,259

(22) Filed: Nov. 19, 2020

(65) Prior Publication Data

US 2021/0262648 A1  Aug. 26, 2021

Related U.S. Application Data

(60) Provisional application No. 62/937,767, filed on Nov. 19, 2019.

(51) Int. Cl.
| | |
|---|---|
| *F21V 23/00* | (2015.01) |
| *F21K 9/232* | (2016.01) |
| *F21K 9/237* | (2016.01) |
| *F21K 9/66* | (2016.01) |
| *F21V 23/04* | (2006.01) |
| *F21V 23/06* | (2006.01) |
| *F21Y 115/10* | (2016.01) |

(Continued)

(52) U.S. Cl.
CPC ............ *F21V 23/009* (2013.01); *F21K 9/232* (2016.08); *F21K 9/237* (2016.08); *F21K 9/66* (2016.08); *F21V 23/045* (2013.01); *F21V 23/0471* (2013.01); *F21V 23/06* (2013.01); *H01R 33/945* (2013.01); *H01R 33/9453* (2013.01); *H01R 33/97* (2013.01); *H01R 33/971* (2013.01); *F21Y 2115/10* (2016.08); *H04W 84/12* (2013.01)

(58) Field of Classification Search
CPC .. H01R 33/945; H01R 33/9453; H01R 33/97; H01R 33/971; H01R 33/973; H01R 13/625; H01R 13/6456; F21K 9/237
See application file for complete search history.

(56) References Cited

U.S. PATENT DOCUMENTS

| 7,869,974 B2 * | 1/2011 | Plishner | H01R 13/6675 |
| | | | 702/108 |
| 9,746,138 B1 * | 8/2017 | Thomas | H05B 45/10 |

(Continued)

*Primary Examiner* — Renee S Luebke
*Assistant Examiner* — Paul D Baillargeon
(74) *Attorney, Agent, or Firm* — Joseph P. Aiena

(57) ABSTRACT

There is provided an LED light with a replaceable module that is connected to an intelligent network. The replaceable module includes a driver element, communication element, and power storage such as a battery. The driver element has circuitry, such as printed circuit boards, which is uniform for mating with any connection component to provide electrical connection. The communication/control element includes communication with a voice orchestrated infrastructure and to Z-link capable systems, via a wireless network. The replaceable module fits inside the opening of a housing which includes a mount for electrical connection to standard electrical outlet. Zone control LED lighting is also provided which is likewise connected to the network for voice control.

10 Claims, 13 Drawing Sheets

(51) Int. Cl.
*H01R 33/945* (2006.01)
*H01R 33/97* (2006.01)
*H04W 84/12* (2009.01)

(56) References Cited

U.S. PATENT DOCUMENTS 9,784,417 B1 * 10/2017 Springer ............... F21V 23/006
2017/0108203 A1 * 4/2017 Habchi ................. F21V 29/777

* cited by examiner

FIG. 2 VOI Bridge Components Diagram

FIG. 3. VOI Bridge Components Diagram

FIG. 4. VOI Bridge System Diagram

LED LIGHT WITH REPLACEABLE MODULE AND INTELLIGENT CONNECTIVITY

CROSS REFERENCE TO RELATED APPLICATIONS

This application claims the benefit of and priority to U.S. Provisional Application Ser. No. 62/937,767 filed on Nov. 19, 2019 and incorporated herein by reference in its entirety.

BACKGROUND

Smart home devices provide convenience and productivity for users, but compatibility of different brands arise for each endpoint device. There is a need for smart home control which is independent of the personal assistant device that is used with the endpoint devices. There is also a need to allow customized devices which the user can modify.

SUMMARY OF THE INVENTION

There is provided a voice orchestrated infrastructure system for use with and in creating smart homes that are controlled by one or more authorized users from a centralized hub device. For one or more of the rooms in a residence or dwelling, each of the rooms has embedded or fastened in fixtures and devices within the room, microphones and speakers which are in communication with the central hub system and also with each other through the central hub system via wi-fi networking. The system of the present invention is not dependent on any particular brand of voice controlled personal assistant device (such as Siri/Alexa/Nest). The microphones/speakers/and video are all controlled and communicated directly through one hub. Service provider that is utilized does not matter. As the voice orchestrated infrastructure is agnostic as to the system or type of personal assistant device employed by the user(s).

The system has Wi-Fi capability to talk to the hub and authorized devices. Motion detection via sound effects to activate the room devices. All privacy is controlled through the hub, along with security features. Communication system protocol—devices in each room of house or dwelling acting as a telephone.

Voice command is directed to an appropriate destination, such as a room, or particular endpoint device in a room. This includes lights, thermostats, electric outlets, appliances—washer, dryer, stove, refrigerator, oven, range, automated vacuums. Security systems for windows and doors, motion detectors, smoke detectors.

The present invention is a lighting device which comprises a removable bulb head for light emission, a plate with at least one light emitting diode (LED) element on a base which electrically contacts a connection (conductive) element with electrical connection to a replaceable module section. The replaceable module section has a driver element, a communication element, and a power storage element; said driver element having circuitry which are uniform for mating and electrically connecting with the connection element electrical connection components. The communication element includes communication with a voice orchestrated infrastructure via a wireless network. The replaceable module is contained inside an opening of a housing which includes a mount for electrical connection to an electrical outlet and the replaceable module is electrically connected to an internal surface of the mount.

The lighting device of the present invention includes an embodiment wherein the voice orchestrated infrastructure system comprises a hub in communication with at least one endpoint device located in a room or area, and the at least one endpoint device in communication with the hub and at least one endpoint device in a second room or area through the hub. The hub includes a non-transitory computer-readable storage medium, which stores computer-executable instructions that when executed by a processor, cause the processor to perform operations for determining the voice command which is communicated to and from the at least one end point device. The at least one endpoint device is activated and controlled by voice commands which are independent of service provider type and the at least one end point device communicating the voice commands to the communication element of the replaceable module.

In an embodiment, there is provided a device with a base module having an end for connection to an electric outlet, a stem section attached to the end, and a housing section attached to the stem section. A connector piece is attached at a top end of the base module with a female connector located on a top surface of the connector piece. The connector piece includes a locking ring wall extending upward from the top surface of the connector piece, and the locking ring wall has a locking ring with first and second key tabs positioned apart from each other on the locking ring, with the first key tab shaped different than the second key tab. A contact plate is placed on the connector piece and surrounded by the locking ring, with the contact plate having a surface with contacts for transfer of power and data from the module and to another module or accessory.

In an embodiment, the device further includes a replaceable module section having a driver element, a communication element, and a power storage element with the driver element having circuitry which are uniform for mating and electrically connecting with the contact plate. The communication element includes communication with a voice orchestrated infrastructure via a wireless network. The replaceable module is contained inside an opening of the housing section which includes a mount for electrical connection to the electrical outlet, and the replaceable module electrically connected to an internal surface of the mount. The replaceable module is capable of transferring power and data, and audio/video to the connected contacts on the contact plate.

DETAILED DESCRIPTION

Figure 1:
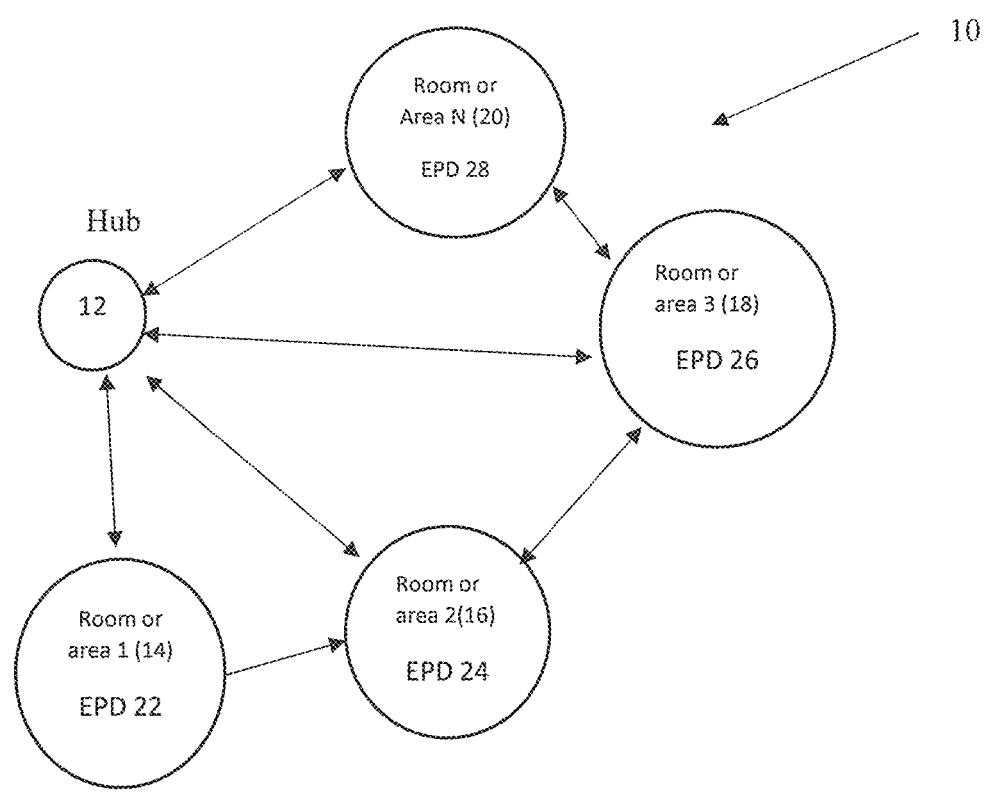
FIG. 1 is an illustration of a hub connected to one or more rooms each with endpoint devices.

As illustrated in FIG. 1 for the present invention 10, each of the Room or area 1 (14), Room/area 2 (16), and Room/area 3 (18) and a plurality of other rooms or areas, designated as room or area N (20), are connected and in communication to the hub 12, with each room or area having one or more endpoint devices (EPD) 22, 24, 26, and 28, such a light switches, outlets, appliances etc. All endpoints 22, 24, 26, and 28 are voice orchestrated or controlled and have microphones and speakers at the endpoints 22, 24, 26, and 28 for communication with, from and back to the hub 12. Through the hub 12, communication can be made to and from any room 14, 16, 18 or 20 for activating or deactivating or adjusting/controlling any device or endpoint 22, 24, 26, and 28 in the room. The system 10 can be synched and controlled with laptop or hand held devices as well whether by voice control or applications. Proprietary software and rules are designed for the hub and system to execute the system of the present invention.

Figure 2:
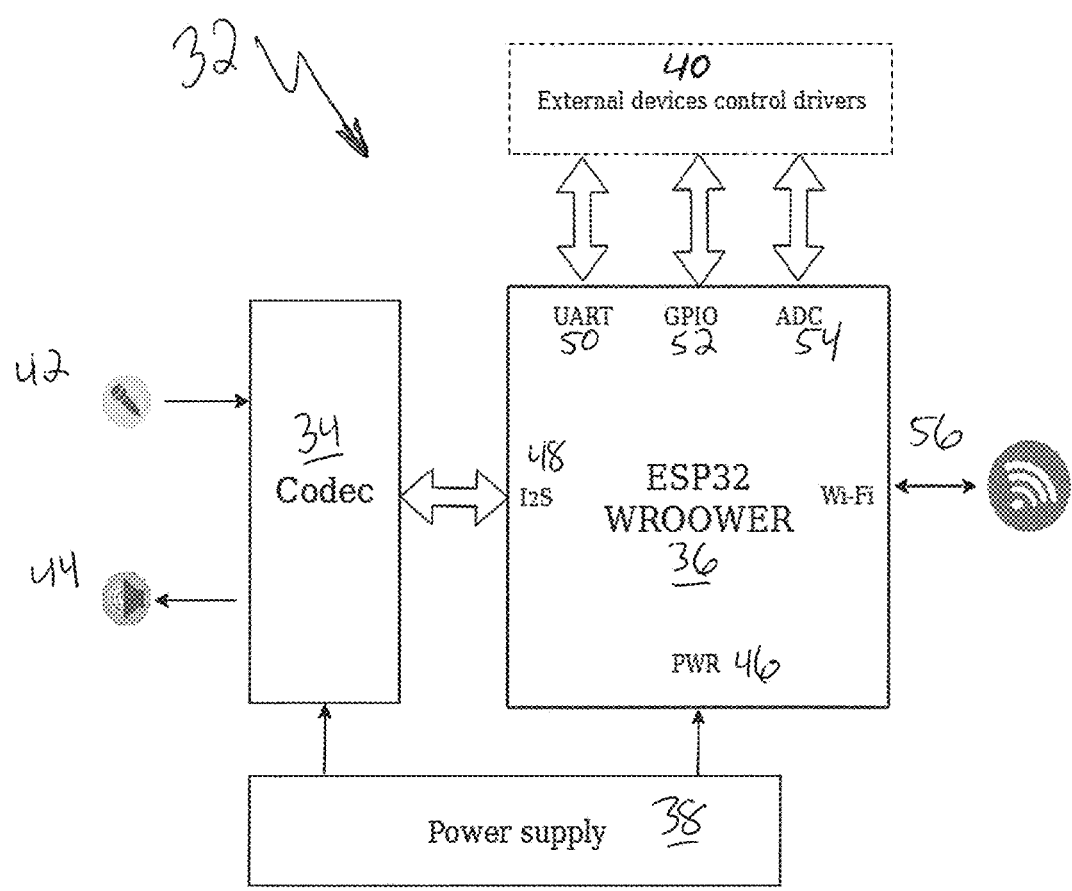
FIG. 2 is a schematic of the voice orchestrated infrastructure bridge components.

Bridge Description:

Referring to FIG. 2, there is shown the VOI bridge components 32. The VOI bridge is a small-sized device based on Espressif ESP-32 chip (eXtensa ESP32). The bridge 32 consisting an array of MEMS microphones 42 connected to an audio codec 34 and an ESP32 Wi-Fi/BT enabled 32 bit microcontroller. The MEMS microphone array on the bridge allows you to leverage voice recognition in your app creations by using the latest online cognitive services including Microsoft Cognitive Service, Amazon Alexa Voice Service, Google Speech API, Wit.ai and Houndify. The bridge provides to users the opportunity to integrate custom voice and hardware-accelerated machine learning technology right onto the silicon. It's for makers, industrial and home IoT engineers. It allows for triggering events based on sound detections, such as receiving a text message when your dog is barking back home. One of the examples of working with bridge—you can build your own Amazon's Alexa using the Bridge 32. Bridge contains the following peripherals: ac/dc power converter 38, 46; general purpose input/output 52, universal asynchronous receiver transmitter (UART) 50, analog-digital converter (ADC) 54, voice/sound streaming information 42, 44; network interface; status indicators; control buttons; low power drivers for control external devices 40 (optional); may have wireless 56 interfaces on-board such as Bluetooth/ZigBee/Z-Wave (optional). External audio coded 34 is used for input/output and coding/decoding of voice/sound information 42, 44. Bridge can work/have internal and external microphones and built-in speaker.

In an embodiment, the end points 22, 24, 26, 28 include a voice proximity sensor and can also be combined with an amplification sensor for the sound wave, as well as at least one directional sensor. In this manner, an individual speaking a command (such as "turn lights on" or "turn lights off") can direct the command to a specific endpoint 22, 24, 26, 28 within a room or a specific room as they enter or leave in order to distinguish from an endpoint in the adjacent room.

Figure 3:
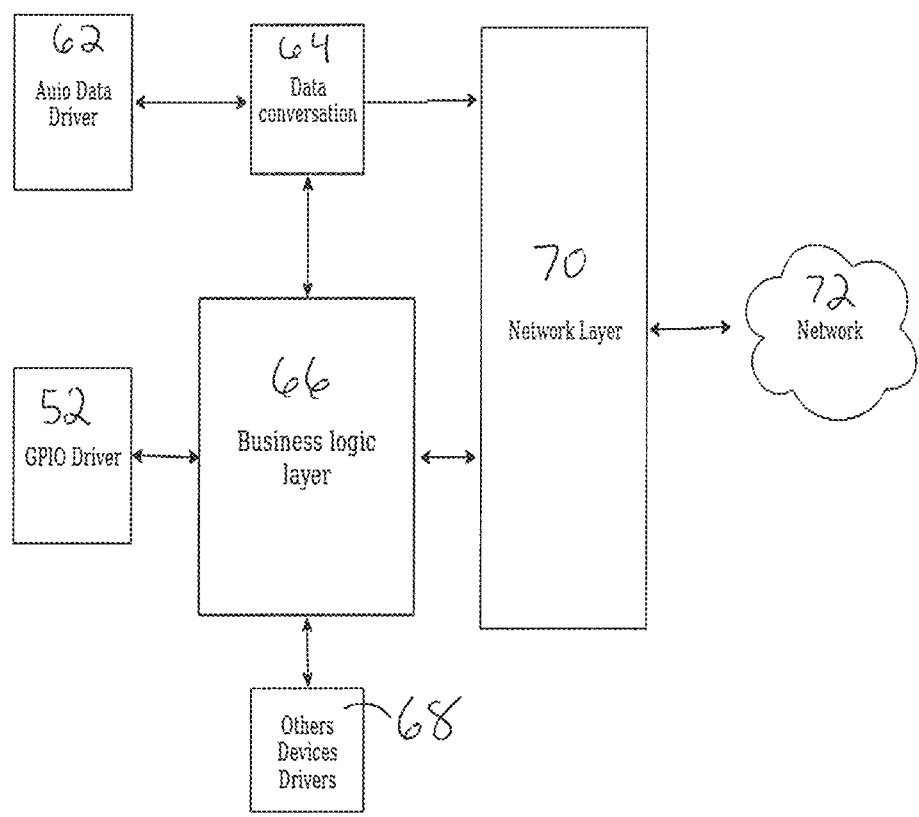
FIG. 3 is a diagram of the bridge components showing drivers, logic layers, and network layers.

Bridge Functions:

The present invention includes perception of voice commands, coding, transmitting to remote voice web-service 84 (Amazon Alexa, Google Assistant, etc.) using protected HTTP connection. This includes: receiving, uncoding, unpacking and playing of sound/voice response from remote voice web-service. There is also the receiving of REST-requests from own web-service (NMA) and control of devices with the help of GPIO's 52 pins or using wireless interfaces. See FIG. 3 to reference the audio data driver 62, communicating and transmitting to data conversion 64 which is in communication with the network layer 70 and business logic layer 66. The business logic layer 66 communicates with the GPIO driver 52 and other device drivers 68. The business logic layer also communicates with the network layer 70 which is in communication with the network 72.

Figure 4:
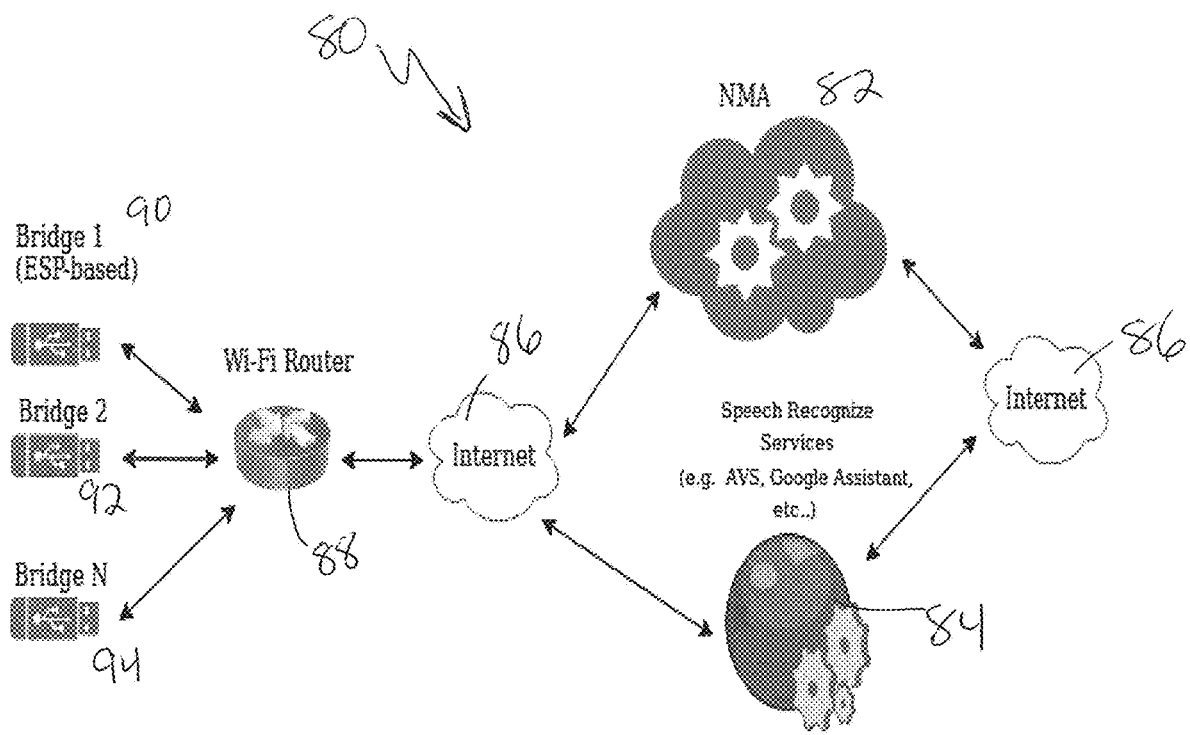
FIG. 4 is a diagram of the bridge system components.

Nma Functions:

Referring to FIG. 4, there is shown the bridge system diagram 80. This bridge system includes a multitude of ESP based bridges 90, 92, 94 connected and communicating with a Wi-Fi router 88 in connection to the internet 86. Communication with an NMA 82 and a speech recognition services 84 to and from the internet 86 is also provided.

NMA 82 is a web service that contains event handlers for voice web services. It handles requests from a remote voice web service (Amazon Alexa, Google Assistant, etc) 84. It sends REST bridge requests according to its own business logic, which is based on processing events from a remote voice web service.

Functions of the Remote Voice Web Service.

This service has the functionality to recognize voice information, the formation of a voice response based on intellectual processing of input data (contains intellectual voice chat) and also contains easily configurable voice command handlers (e.g. Alexa Skills) and NMA web service management.

Working Flow:

After power supply to the bridge, the device enters the standby mode of initialization, which is displayed by the indicator. The device is initialized by pressing the "mic" button or by pre programmed wake-up word. In the initial initialization mode, the bridge raises the access point with the SSID (brige_xxxxx). This is necessary to configure the basic parameters such as WIFI AP and voice web service account 84. Setup is performed using a mobile IOS/Android application. The user installs the mobile application. The mobile device must be connected to the WIFI AP bridge. After successful setting, the bridge disables the access point. To reset the settings, you must hold the "reset" button.

The configured bridge connects to the NMA 82 and also has a connection to the remote voice web service 84. After successfully connecting to the NMA 82, the bridge is waiting for the wake-up voice command word. The user has the ability to customize the wake-up word voice command using a mobile application. User information will be stored in the bridge ROM in encrypted form. The key for encryption is located in a secure section of the flash. These states are accompanied by light/sound indication.

The user initiates voice control of bridge by the wake-up word. After processing of wake-up word, the bridge goes into the mode of transmitting voice information to the voice service. A voice communication session has a specified timeout upon completion of which commands are not transmitted to the voice service. For subsequent sessions, you must repeat the pronunciation of wake-up word. Initialization of communication sessions is accompanied by a light/ sound indication. The voice service receives voice information from the bridge, processes the request, sends an audio response to the bridge, and, if necessary, transmits the necessary request to the NMA. NMA in turn controls the bridge. (See FIG. 4)

Figure 5:
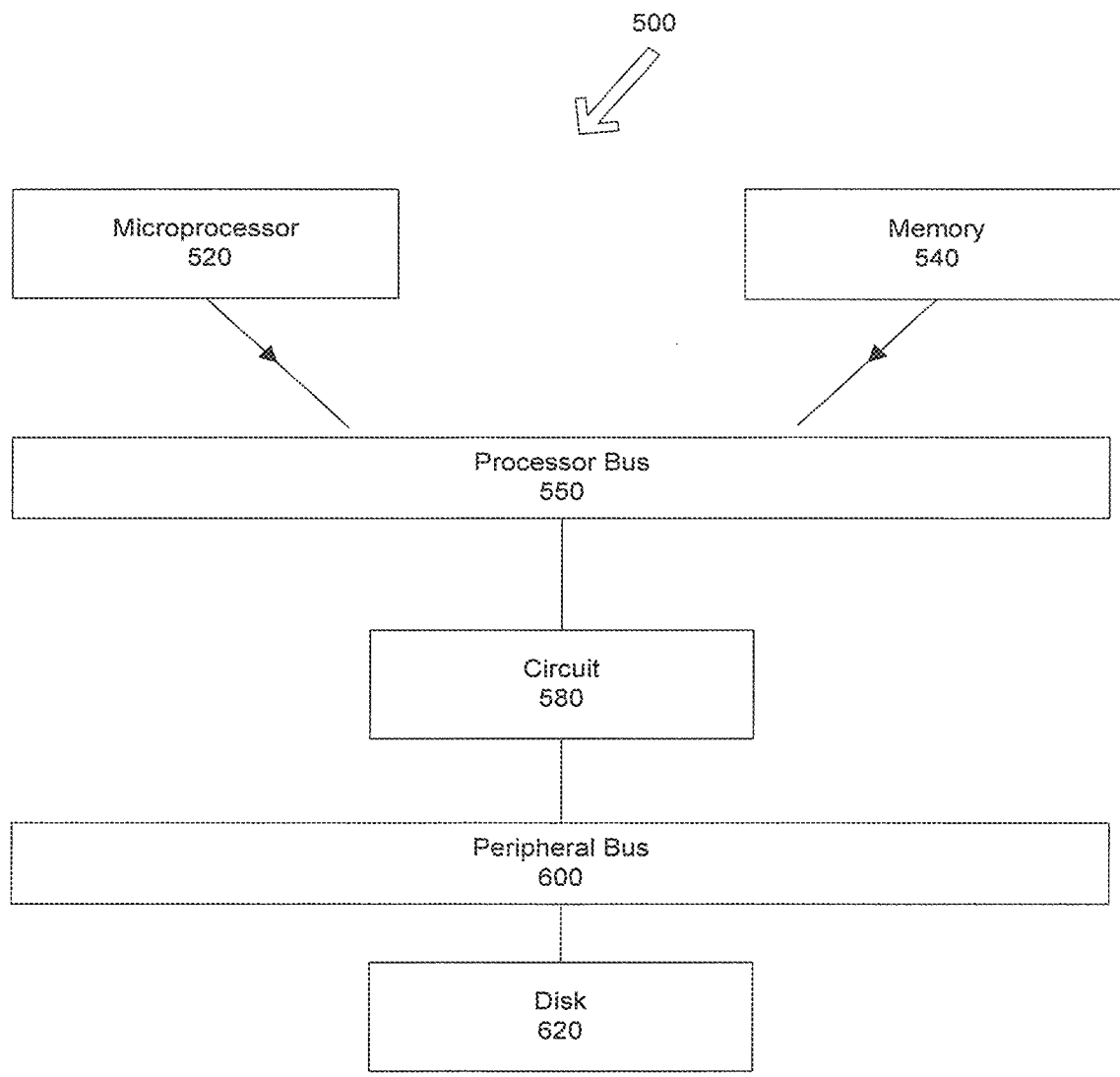
FIG. 5 is a schematic of the computer device components of the present invention.

FIG. 5 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

Figure 6:
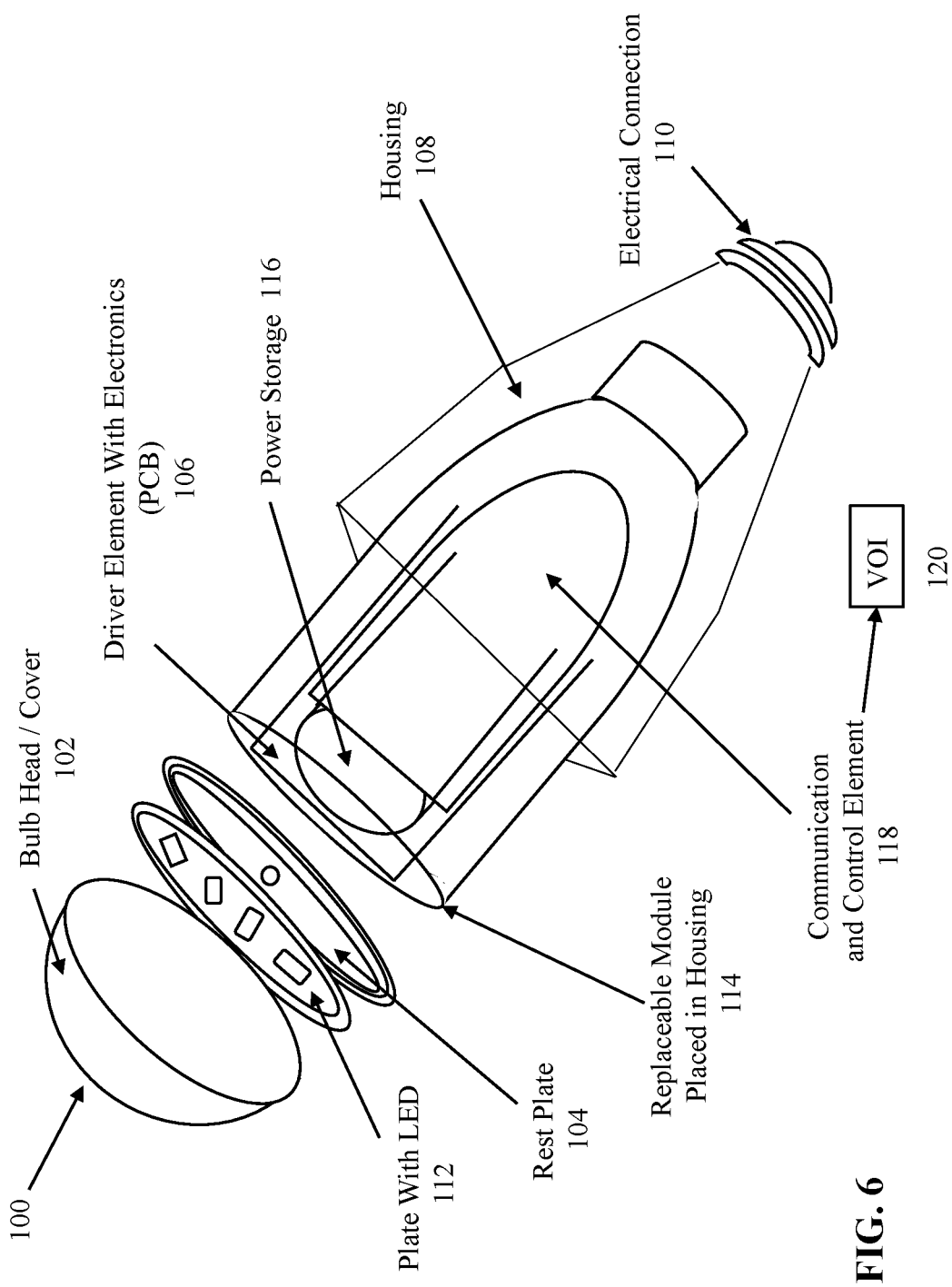
FIG. 6 is an assembly diagram of the LED light device of the present invention.
Figure 7:
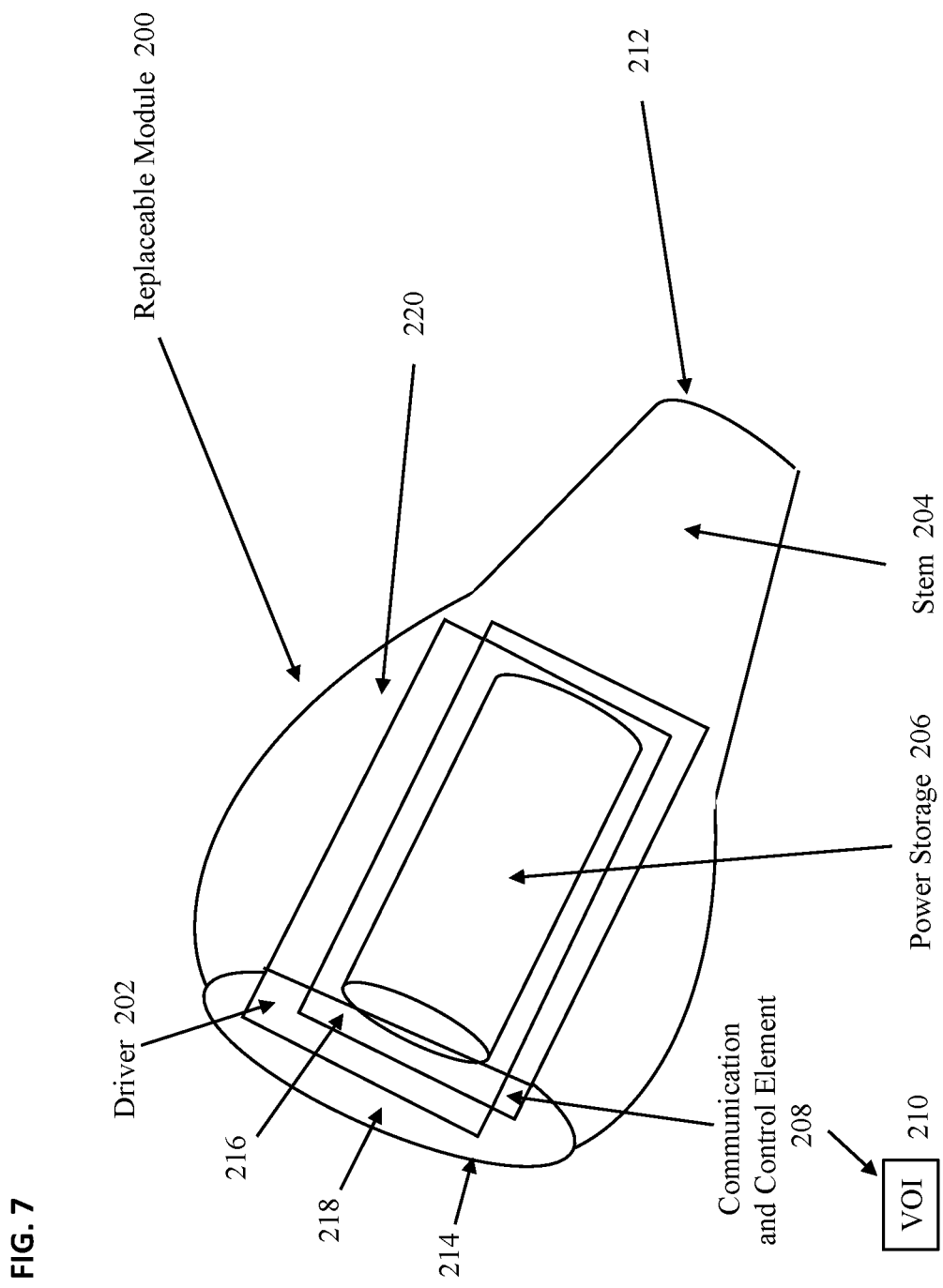
FIG. 7 is a schematic of the replaceable module of the present invention.

There is provided an LED light with a replaceable module that is connected to an intelligent network, including the voice orchestrated infrastructure described herein. As shown in the accompanying FIGS. 6 and 7, the LED light 100 of present invention includes a bulb head or cover 102 for light emission; a plate 112 with one or more light emitting diodes (LED) elements on a base which rests upon connection (conductive) element, such as a rest plate 104 or has electrical connection with the replaceable module section 114. There should be multiple LED elements present, but a minimum of at least three pieces.

The replaceable module 200 includes a driver element 106 or 202, communication element 118 or 208, and power storage 116 or 206 such as a battery. These are positioned inside a cavity 216 within the replaceable module 200 after placement through a top opening 218 of the module 200. The opening 218 is formed by a rim 214 and leads to the inner cavity 216 which stores the driver element 106, 202 and communication element 118, 208, power storage 116, 206. The driver element 106 or 202 has circuitry, such as printed circuit boards, which are uniform for mating with any connection component to provide electrical connection. The communication/control element 118 and 208 includes communication with a voice orchestrated infrastructure 120 and 210 and to Z-link capable systems, via a wireless network. The replaceable module 200 fits inside the opening of a housing 108 which includes a mount for electrical connection 110 to standard electrical outlet. The internal surface of the mount electrically connects with the replaceable power module 200, preferably at or near a stem section 204 of the module 200, located at one end or bottom 212 of the replaceable module 200. The stem section 204 has a continuous surface and is integrally formed with the outer surface 220 of the cavity section.

Upon burn out/end of life of the replaceable power module, this module element 200 is removed from the light assembly and replaced. Some typical specifications for the present invention would include the following: a wattage of 8 watts to 120 watts; usable with 50 Hz, 240 Volt power supply; and a luminous efficiency of greater than 90 lm/W. These specifications are not meant to be limiting in any regard as other specifications are within the scope of the present invention.

Figure 8:
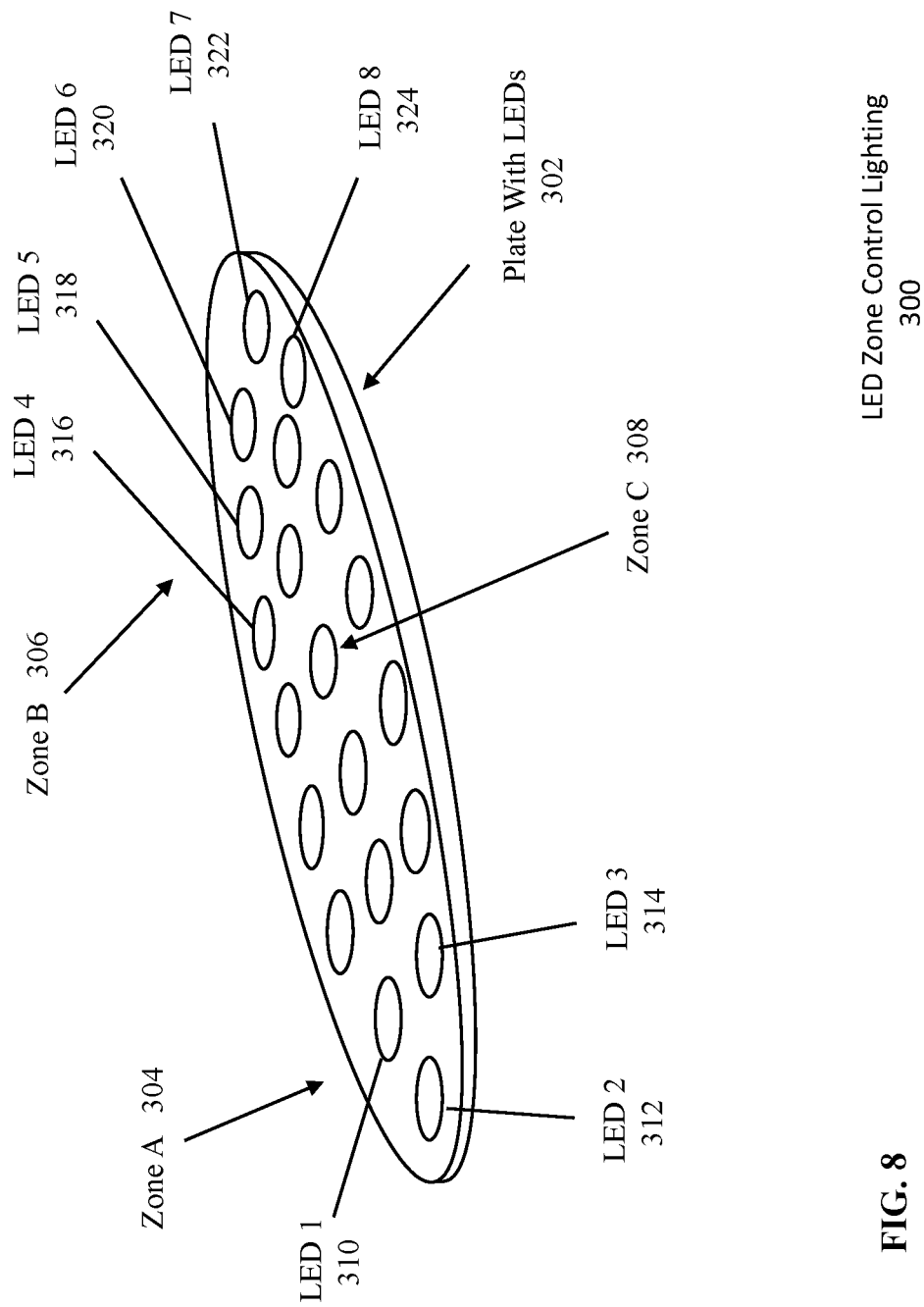
FIG. 8 is a schematic diagram of the LED zone control lighting of the present invention.

There is also provided an embodiment of the present invention in which LED zone control lighting 300 is established. As illustrated in FIG. 8, there is an LED plate having multiple LEDs 302. In the diagram shown, there are also multiple zones A (304), B (306), and C (308) on the plate 302. Each of these zones A, B, and C (304-308) have an associated set of LEDs positioned within the zone and on the plate. For example, LEDs (1-3) (310, 312, and 314) are located within Zone A on a first side area of the plate and LED4, LED5, LED6, LED7, LED8 (316, 318, 320, 322, and 324) are located in Zone B on a second side area of the plate. Similarly, additional LED's are located in central Zone C. The LED's are all connected electronically as previously noted to the replaceable module. By having zone controlled lighting, the LEDs in a particular zone of A, B, or C (304, 306 or 308 respectively), or a combination thereof, may be chosen to illuminate by the user's input and control. In this manner, lighting may be selectively and directionally positioned by the controller/user. The use of different color LEDs in each of the zones A, B, or C (304, 306, 308) can provide the user with additional options for directional colors with the lighting. Different brightness capability may be included as well. Each of these options are included through the connections to the voice orchestrated infrastructure and Z-link capable systems. For example, if the user only wants Zone A LEDs for lighting, then the LEDs 1 through 3 (310, 312, 314) would be activated and illuminated and not the other LEDs. Similarly, if the user wants Zone B LEDs for lighting, then only LEDs 4, 5, 6, 7, and 8

(316, 318, 320, 322, 324) would be activated and illuminated. This provides direction illumination from each of these respective zones.

The LED of the present invention is designed to be compatible with Power over Ethernet (POE) systems for transmission of data and electric.

The intelligent connectivity of the present invention is described with reference to a voice orchestrated infrastructure system 120 and 210. This allows for voice control of the LED light (s) with the replaceable module of the present invention. This communication occurs through Wi-Fi or Z-Wave enabled connections and circuitry in the replaceable module.

There is provided herein a description of a voice orchestrated infrastructure system for use with and in creating smart homes that are controlled by one or more authorized users from a centralized hub device. The LED light with replaceable module is usable in this system as an endpoint.

For one or more of the rooms in a residence or dwelling, each of the rooms has embedded or fastened in fixtures and devices within the room, microphones and speakers which are in communication with the central hub system and also with each other through the central hub system via wi-fi networking.

The system of the present invention is not dependent on any particular brand of voice controlled personal assistant device (such as Siri/Alexa/Nest).

Microphones/speakers/video are all controlled and communicated directly through one hub. Service provider that is utilized does not matter. As the voice orchestrated infrastructure is agnostic as to the system or type of personal assistant device employed by the user(s).

The system has Wi-Fi capability to talk to the hub and authorized devices. There is also motion detection via sound effects to activate the room devices, and all privacy is controlled through the hub, along with security features. The communication system protocol provides for devices in each room of house or dwelling to act as a telephone.

Voice command is directed to an appropriate destination, such as a room, or particular endpoint device in a room. This includes lights, thermostats, electric outlets, appliances—washer, dryer, stove, refrigerator, oven, range, automated vacuums. It also includes security systems for windows and doors, motion detectors, smoke detectors.

Figure 9B:
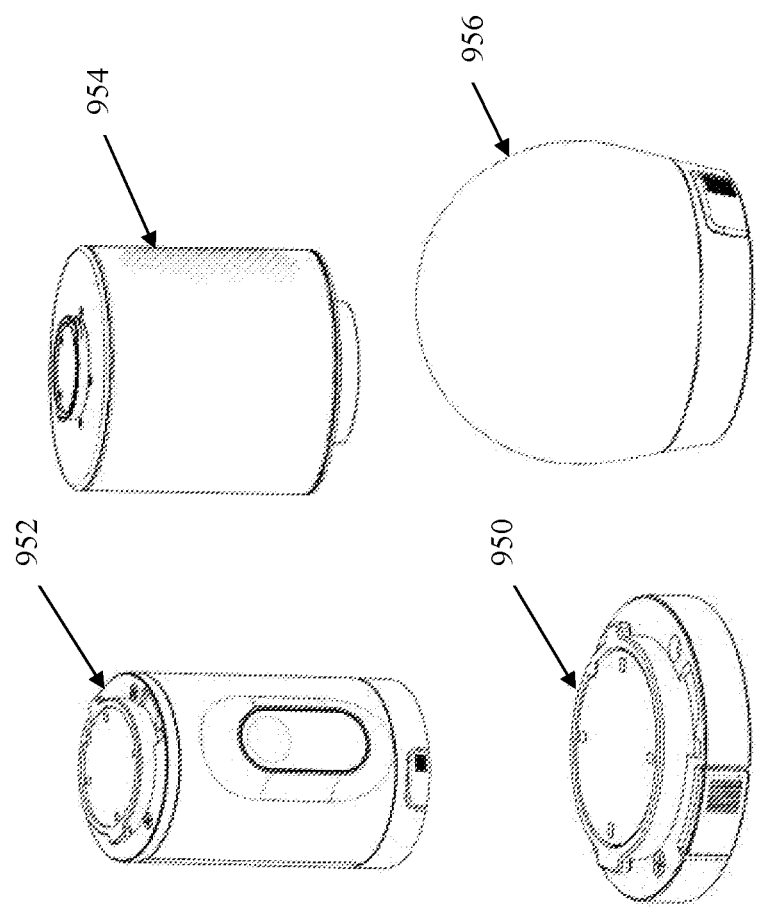
FIG. 9A-B are schematics of an embodiment of the LED light device of the present invention with accessory modules.
Figure 9A:
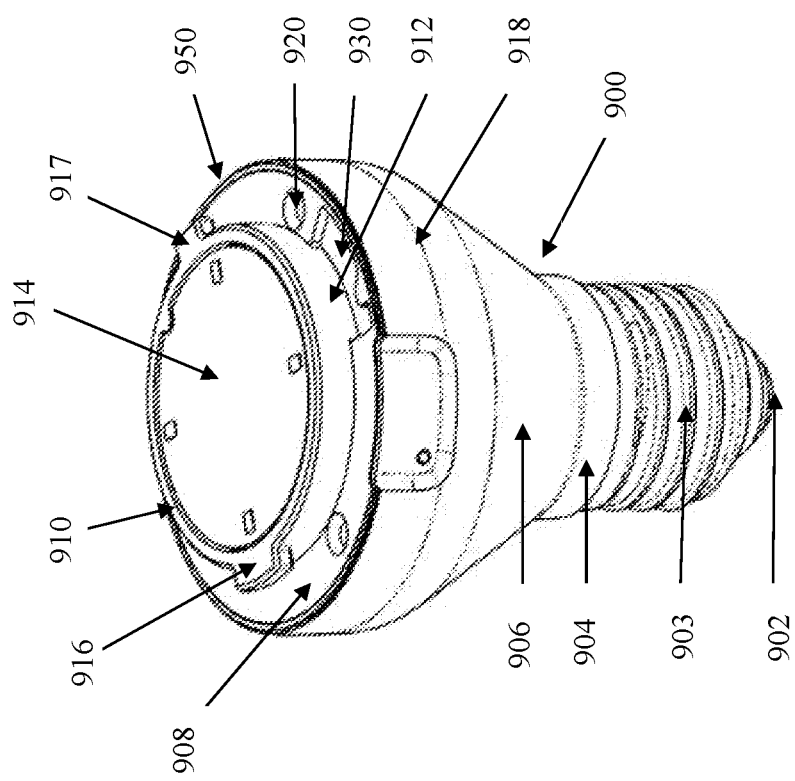

Referring to FIGS. 9A and 9B, there is shown an embodiment of the base module lighting or smart device of the present invention. The modular lighting devices and their internal components described previously herein are capable of use with this embodiment as well. With FIG. 9A, there is shown the base module 900 which has an end 902 for connection to an electric socket or outlet with electrical contacts as known in the art, a stem section 904 which may be integrally formed or removably attached with the end 902, and a bulb shaped housing section/area 906 which likewise may be integrally formed with or alternative removably attached to the stem section 904. The end 902 includes threads 903 for connection to electric socket. On top of bulb shaped housing area 906 is fastened a connector ring 950 which creates a top surface 908 of base module 900. The connector ring 950 aligns with the edge 918 of the bulb shaped area 906, although other configurations are within the scope of this invention. Mount holes 920 may be located on the connector ring 950 for fastening the connector ring piece 950 to the base module 900. Mechanical connections may also be used for connecting the connection ring 950 to base module 900. A female connector area opening 930 is positioned and located on the top surface 908 of the connector piece 950 which receives a male connector from an accessory (as in FIG. 12) or another connector piece positioned over the connector ring/piece 950. Extending from the top surface 908 of connector 950 is the locking ring wall 912 which is surrounded by a locking ring 910 and a contact plate 914 placed on the connector piece 950, surrounded by and within the locking ring wall 912. The locking ring 910 has at least one and preferably, a pair of key tabs 916 and 917 which are separately positioned from each other, preferably in asymmetrical positions on said ring and asymmetrical in shape as well, with one tab being a different size or shape than the other tab. The contact plate 914 has a surface with electrical contacts and data contacts for transfer of power/data to the accessory or to another such connector piece 950 when attached.

FIG. 9B illustrates various accessories which can be combined with the base module design and include a limitless variety of functions. These accessories include items such as LED lights, or another connector and locking ring 950, Bluetooth or camera accessories 952, speaker or sound systems 954, or various caps 956 for the lighting and system for aesthetic or functional purposes. Multiple accessories may be added to a base module to increase the functionality by adding connector pieces 950. (See FIG. 11).

Figure 10:
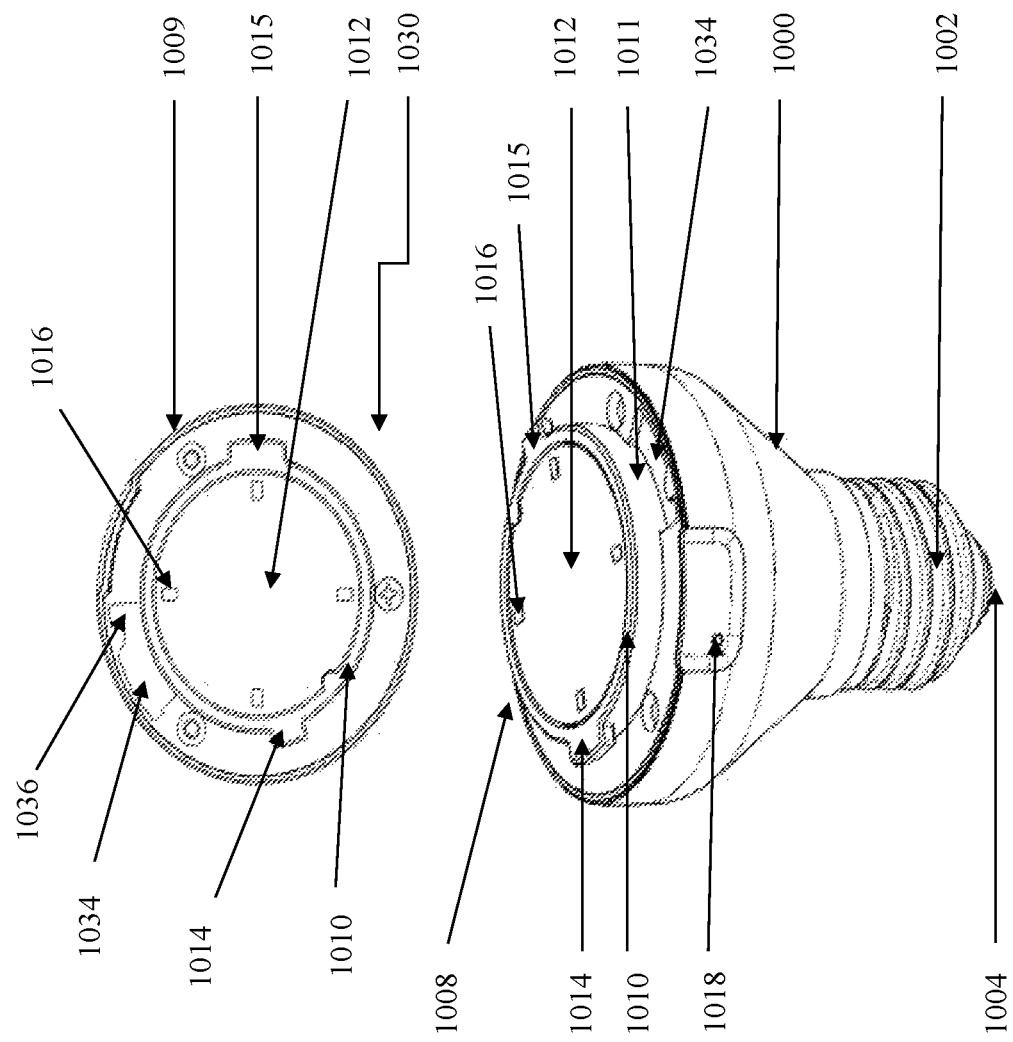
FIG. 10 is a schematic of an embodiment of the present invention indicating locking features.
Figure 12B:
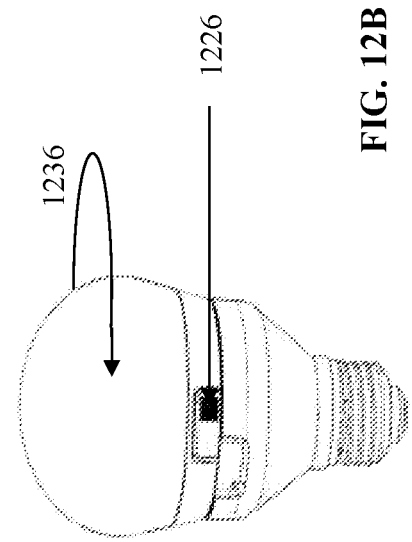
FIG. 12A-C is a schematic of the present invention and the locking features.
Figure 12C:
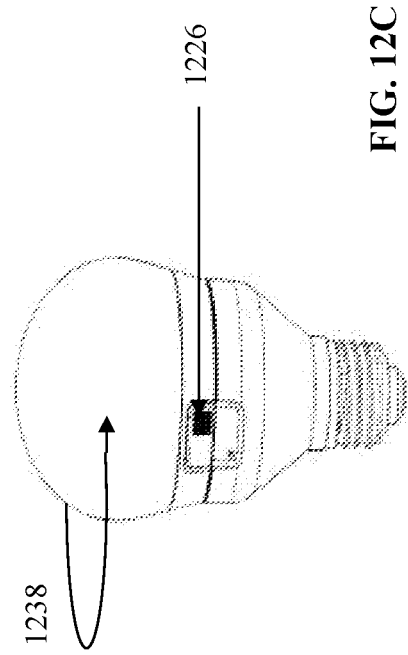
Figure 12A:
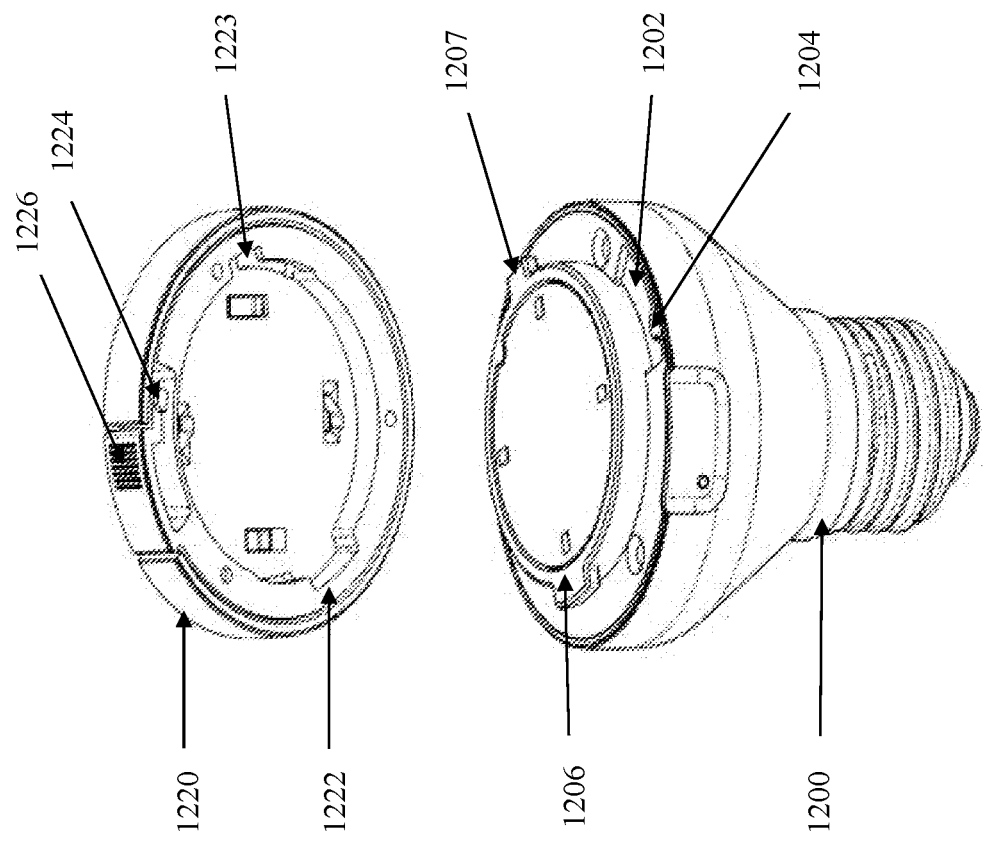

With reference now to FIG. 10, there is shown the locking features of the present invention from top and front angled views. The base module 1000 is shown again and includes an end 1004 for connection to a power outlet and includes threads 1002 for standard mating connections. Typical E26 threads are shown (a U.S. standard), but could be swapped for a variety of other electrical/power connection types based on a standard for the particular geo-location. Inside the base module 1000 are the components described earlier, such as the communication component and AC/DC power supply and transfer. The base module includes a top end 1008 which includes the connector piece 1009 with locking ring 1010 on the upward extending ring wall 1011 and top surface 1012 with electric/power and/or data contacts. On the locking ring 1010, there are asymmetric interlock features—that is, the accessory modules only connect to the base 1000 one-way and one direction by a set of key tabs 1014 and 1015 where one key tab is larger or shaped differently than the other. The top view 1030 of base module 1000 provides a view where it can be seen that the key tabs 1014 and 1015 are distinguishable from each other in size and/or shape and positioned apart from each other along locking ring 1010. The locking features also include a female connector 1034, which is able to accept and interlock with added accessory modules. The female connector 1034 includes a locking slot area 1036 which secures the accessory male connector (FIG. 12). The base module 1000 has electrical and data contacts 1016 on the top surface 1012 exposed for module connection, which in this manner passes power to connected modules. The set up could also pass data, heat dissipation, connection status, among other information as well. A power indicator light 1018 is provided as well on the base module 1000.

Figure 11:
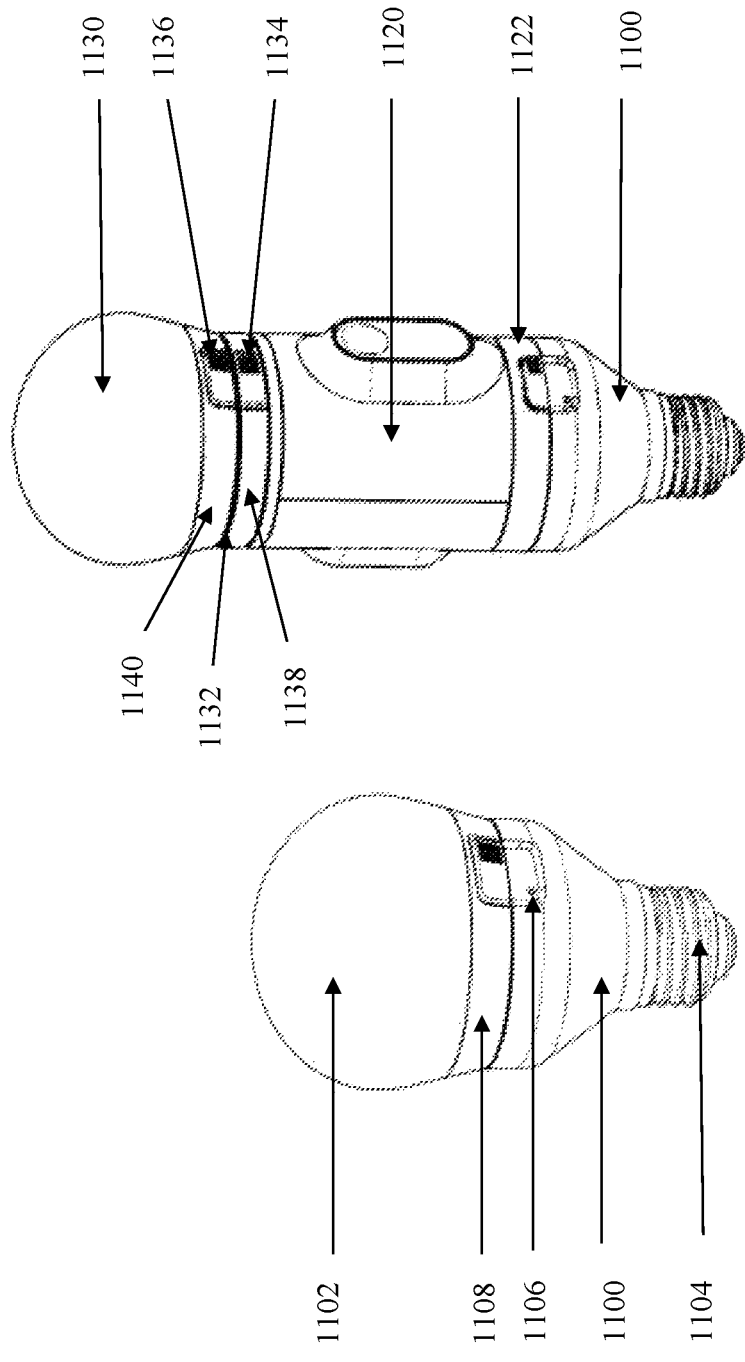
FIG. 11 is a schematic of the accessory modules attached with the present invention.

In FIG. 11, there is shown the embodiment of the present invention with multiple accessory pieces attached to the base module 1100. In the first diagram of FIG. 11, there is shown a single accessory 1102 attached to the base module piece 1100, which includes the threads 1104 for electrical connection to a power socket. The base module 1100 and the accessory piece 1102 are joined by connection piece 1108 at their respective surfaces allowing for transfer of power and data, audio and video, wi-fi connectivity can be included as well. Power indicator light 1106 provides for visual inspection of a proper connection of electric and data when the light is on.

In the second diagram of FIG. 11, there is shown the base module 1100 with a first accessory 1120 attached to the base module 1100 and joined at connection piece 1122, which provides mechanical as well as electrical, and data, audio/video connection as well as wi-fi. Attached and connected above the first accessory 1120 is a second accessory 1130, which may be a different type of accessory than the first accessory 1120—such as an aesthetically designed light cap. The first accessory 1120 and second accessory 1130 have respective connection pieces 1138 and 1140 joining at 1132 to connect power, and data, audio/video from one accessory to the second accessory. A respective release button, such as 1134 and 1136, on each respective connection piece 1138 and 1140 allows for the connection pieces 1138 and 1140 to be released from locking mechanisms described above with FIG. 10 and also with FIG. 12. Power indicator lights (such as 1106) provide visual inspection that proper connection at 1132 has been made for transfer of power and data, audio/video and wi-fi. The accessory modules can be added to the base module and also to each other in a variety of different configurations. It may be just one accessory added to the base or as many accessories stacked and connected as desired.

The added accessory has the ability to interlock into the base module (the size and shape of external shell can vary). This is seen in FIG. 12, with the asymmetric keying features aligning the modules and accessories. In use, the accessory or connector 1220 placed over the base module piece 1200 with connector ring. In doing so, the key tabs 1206 and 1207 of the base module 1200 are received into the appropriate key tab receiving areas 1222, 1223 of the accessory or connector 1220, as each key tab 1206, 1207 may be positioned differently or a different size to ensure the one way locking mechanism. The key tab receiving areas 1222, 1223 are located at a corresponding location on the underside of the accessory/connector 1220 to align with the position of the key tabs 1206, 1207. The release button 1226 and male connector 1224 on the accessory 1220 interfaces with and is received by the female interlock feature 1202 on the base 1200. The female interlock feature 1202 includes a mechanical connection, such as a slot area 1204 with a protrusion, or hook or notch which locks the male interconnector piece 1224 of the accessory 1220 when it is rotated from a first position to a second locked position. The accessory 1220 is turned clockwise to lock, anywhere from approximately five to ninety degrees, with thirty degrees of rotation as preferable, as shown by arrow 1236 in FIG. 12B. This allows the key tab receiving areas 1222, 1223 to rotate away from key tabs 1206, 1207 after receiving the key tabs, to thereby secure and lock the accessory 1220 such that the key tabs 1206, and 1207 no longer align with the receiving areas 1222, 1223 and cannot be separated from the now attached accessory 1220. In order to unlock the accessory 1220 from the base module 1200, the release button 1226 is pressed and the accessory 1220 is turned counterclockwise to release as shown by arrow 1238. By pressing the release button 1226, the male connector piece 1224 is moved to a position in the slot area 1204 free from the mechanical connection of a hook, protrusion, or notch. Other accessories may be attached in similar manner to the base module 1200 or to other accessories by key tabs and respective receiving areas on the accessories. The rotation and locking mechanism described herein are used to align power and communication throughout the lengths of each attached module and accessory and the entire desired assembly as the user includes various modules and accessories.

Figure 13:
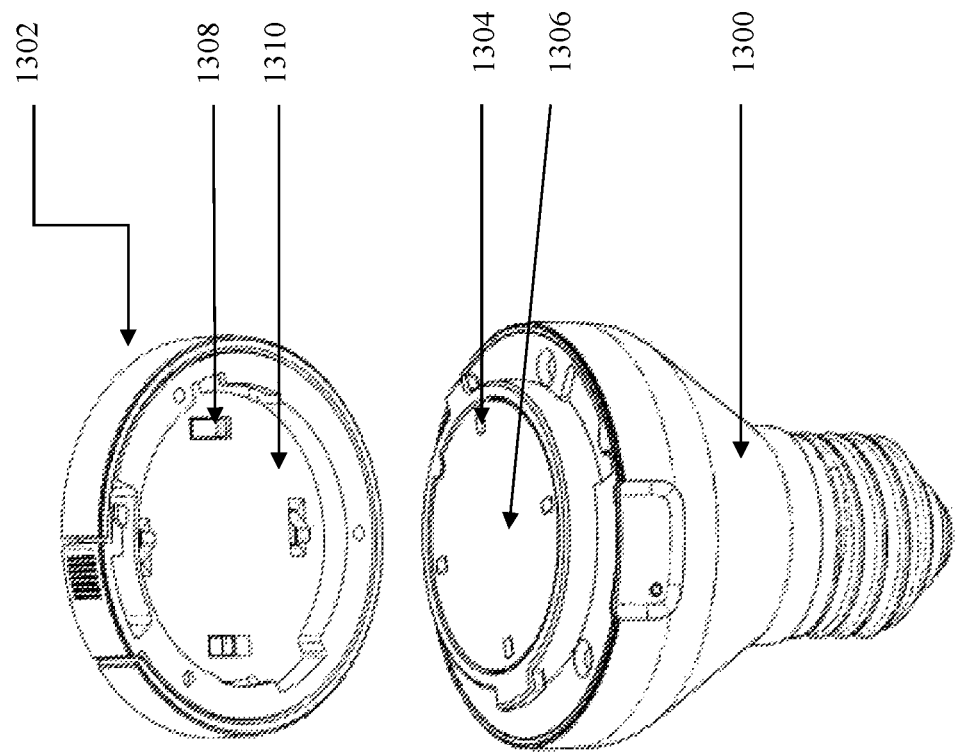
FIG. 13 is a schematic of the power and data contacts on the device of the present invention.

As seen in FIG. 13, if power or data is required to pass into the attached accessory, as will often be required with different accessories, the added accessory needs contact with the electrical hardware to accept power from the base DC-contacts. The contact pads on the base printed circuit board (PCB) come in contact with spring-contacts on an accessory module. When in contact, these connections can pass power and data if required. The base module 1300 in FIG. 13 has a plurality of electric contact pads 1304 on the top surface 1306 extending from the base module PCB. These one or more electric contact pads 1304 electrically contact, and physically contact, the spring type contacts 1308 located on the surface 1310 of the accessory 1302.

This invention is not restricted to the details of the foregoing embodiments. The invention extends to any novel one, or any novel combination, of the features disclosed in this specification (including any accompanying claims, abstract and drawings), or to any novel one, or any novel combination, of the devices or steps of any method or process so disclosed.

What is claimed is:

1. A device comprising:
   a base module having an end for connection to an electric outlet, a stem section attached to said end, and a housing section attached to said stem section;
   a connector piece attached at a top end of the base module with a female connector located on a top surface of said connector piece, said female connector defined by a slot area opening in said top surface and having a protrusion within said slot area opening;
   a locking ring wall extending upward from said top surface of said connector piece, said locking ring wall having a locking ring with first and second key tabs positioned apart from each other in asymmetrical positions on said locking ring, said first key tab shaped different than said second key tab;
   a contact plate placed on said connector piece and surrounded by said locking ring, said contact plate having a surface with contacts for transfer of power;
   a replaceable module section having a driver element, a communication element, and a power storage element; said driver element having circuitry which are uniform for mating and electrically connecting with said contact plate;
   said communication element includes communication with a voice orchestrated infrastructure via a wireless network;
   said replaceable module contained inside an opening of said housing section which includes a mount for electrical connection to said electrical outlet; said replaceable module electrically connected to an internal surface of the mount;
   said female connector of said connector piece receiving a male connector of a second connector piece in said slot area opening of said female connector and locking said male connector by said protrusion of said slot area when said male connector is rotated from a first position to a second position, said second connector piece having a release button for unlocking said second connector piece from said connector piece after joining said second connector piece with said connector piece.

2. The device of claim 1 wherein said first and second key tabs are asymmetrical in shape.

3. The device of claim 1 wherein said contact plate surface has contacts for transfer of data.

4. The device of claim 1 further including an accessory combined with said base module by attachment to said connector piece.

5. The device according to claim 4 wherein said accessory only connects to said base module in one direction.

6. The device according to claim 4 wherein said accessory is turned clockwise from approximately five to ninety degrees to lock.

7. The device according to claim 1 wherein said first and second key tabs are received into a key tab receiving area of an accessory.

8. The device according to claim 1 wherein said connector piece allows for transfer of audio.

9. The device according to claim 1 wherein said connector piece allows for transfer of video.

10. The device according to claim 1 wherein said connector piece allows for wi-fi connectivity.

* * * * *